United States Patent [19]
Olson et al.

[11] Patent Number: 5,611,563
[45] Date of Patent: Mar. 18, 1997

[54] AIRBAG INFLATOR ATTACHMENT WITH SNAP-IN SLEEVE

[75] Inventors: Brent K. Olson, Clearfield; J. Kirk Storey, Farmington; David J. Green, Brigham City; Davin G. Saderholm, Salt Lake City; S. Mark Bunker, North Ogden; Daniel G. Minert, Clearfield, all of Utah

[73] Assignee: Morton International, Inc., Chicago, Ill.

[21] Appl. No.: 643,450

[22] Filed: May 8, 1996

Related U.S. Application Data

[63] Continuation-in-part of Ser. No. 583,438, Jan. 5, 1996, abandoned.
[51] Int. Cl.⁶ .................................................. B60R 21/16
[52] U.S. Cl. ................................. 280/728.2; 280/741
[58] Field of Search ............................. 280/728.2, 732, 280/741

[56] References Cited

U.S. PATENT DOCUMENTS

| 5,308,108 | 5/1994 | Rion | 280/728.2 |
| 5,458,364 | 10/1995 | Muller et al. | 280/728.2 |
| 5,468,012 | 11/1995 | Mihm | 280/728.2 |
| 5,498,029 | 3/1996 | Mossi et al. | 280/741 |
| 5,558,362 | 9/1996 | Acker et al. | 208/728.2 |

Primary Examiner—Kenneth R. Rice
Attorney, Agent, or Firm—George W. Rauchfuss, Jr.; Gerald K. White

[57] ABSTRACT

An airbag inflator assembly including an airbag inflator and an inflator attachment having a sleeve. The inflator includes an elongated sidewall and an end having a flange stop extending outwardly from the sidewall. The sleeve receives and supports the sidewall of the inflator with the flange stop butting against the sleeve. The sleeve has an inwardly extending resilient tab that faces away from the flange stop and engages a gas exhaust port defined by the sidewall to retain the inflator within the sleeve. At least one stud extends transversely to and outwardly from the sleeve for mounting the inflator attachment and inflator within an airbag module. The inflator attachment further includes at least two spaced-apart pairs of diametrically opposed ribs protruding inwardly from the sleeve and grippingly engaging the sidewall of the inflator. The sleeve also defines gas exhaust outlets, which on different versions of the sleeve may vary to accommodate different types of inflators. According to one alternative embodiment, the inflator does not include a flange stop. Instead, the sleeve includes an endwall that butts against the inflator, with the resilient tab facing the endwall. According to another embodiment, the inflator sidewall has a tapered neck, and the resilient tab engages the tapered neck instead of the gas exhaust port. According to an additional embodiment, the sleeve does not include the resilient tab but only includes the at least two spaced-apart pairs of diametrically opposed ribs for grippingly engaging and securing the inflator within the sleeve.

33 Claims, 8 Drawing Sheets 5,611,563

AIRBAG INFLATOR ATTACHMENT WITH SNAP-IN SLEEVE

RELATED APPLICATION

The present Application is a Continuation-In-Part of application Ser. No. 08/583,438, filed on Jan. 5, 1996, now abandoned.

FIELD OF THE INVENTION

The present invention relates to an airbag module. More particularly, the present invention relates to an airbag inflator attachment with a snap-in sleeve for mounting an airbag inflator in a side-impact or passenger side airbag module.

BACKGROUND OF THE INVENTION

Providing easy attachment for mounting an airbag inflator within an airbag module, reducing the size of an airbag module and reducing the number of parts comprising an airbag module would be useful. An airbag module is part of an inflatable restraint system that is employed in an automobile for protecting an occupant against injury by physically restraining the occupant's body when the automobile encounters a collision. A side impact airbag module protects occupants from side collisions to the automobile and can be positioned in a seat, on the exterior of a seat, in a door or in a side pillar. A passenger side airbag module protects a passenger and is normally positioned in the dashboard in front of the passenger side seat.

A side impact or passenger side airbag module typically includes an airbag cushion and an inflator contained within a reaction canister. The inflator has an elongated cylindrical housing having gas exhaust ports and containing gas generant that, once triggered by a remote collision sensor, provides the inflation gas for inflating the airbag cushion. A hybrid inflator has gas exhaust ports located centrally or at one end while pyrotechnic inflators have gas exhaust ports distributed substantially along their entire length.

The inflator is usually mounted in the reaction canister by a flange end or attachment and fasteners such as a nut and threaded stud, the stud extending from the other end of the inflator. The flange end or attachment and the fastener engage opposite endplates of the reaction canister to secure the inflator therein. These securing means, however, impose structural limitations on the inflator, add additional parts to the airbag module, are sometimes difficult to assemble and are not conducive to automated assembly of the airbag module.

Providing an attachment for mounting an airbag inflator within an airbag module that requires fewer parts, less assembly time, is conducive to automated assembly, and that will help to reduce the size of an airbag module would be useful and desirable.

SUMMARY OF THE INVENTION

An object, therefore, of the present invention is to provide means for mounting an airbag inflator within an airbag module that requires fewer parts.

Another object of the present invention is to provide means for mounting an airbag inflator that reduces assembly time.

An additional object of the present invention is to provide means for mounting an airbag inflator that is conducive to automated assembly.

A further object of the present invention is to provide means for mounting an airbag inflator that reduces the size of an airbag module.

In carrying out this invention, there is provided an inflator attachment for mounting an airbag inflator in an airbag module. The inflator attachment and airbag inflator form an airbag inflator assembly. The airbag inflator has an elongated sidewall, and the inflator attachment has a sleeve receiving and supporting the elongated sidewall. The inflator attachment also has at least one mount extending from the sleeve for securing the airbag inflator assembly within an airbag module. The airbag inflator and inflator attachment are adapted for butting engagement, and the sleeve has at least one inwardly projecting grip sized and adapted to allow passage of the sidewall of the airbag inflator into the sleeve and to engage the airbag inflator. The airbag inflator, when inserted into the sleeve, is retained therein by the inwardly projecting grip and the butting engagement between the sleeve and the airbag inflator.

According to one aspect of the present invention, the grip is in the form of a plurality of spaced-apart protrusions extending inwardly from the sleeve and sized to securely and grippingly engage the sidewall of the airbag inflator. According to still another aspect of the present invention, the plurality of spaced-apart protrusions are in the form of at least two spaced-apart pairs of diametrically opposed ribs.

According to another aspect of the present invention, the inflator attachment is for use with an airbag inflator having a sidewall defining a snap receptor and the grip is in the form of a resilient tab projecting inwardly from the sleeve and bendable away from the airbag inflator to allow passage of the sidewall of the airbag inflator and engageable in the snap receptor of the airbag inflator. According to an additional aspect of the present invention, the grip further includes a plurality of spaced-apart protrusions extending inwardly from the sleeve and sized to grippingly engage the sidewall of the airbag inflator and provide a shake and rattle free engagement between the airbag inflator and sleeve.

According to still additional aspects of the present invention, the sleeve includes an endwall for butting against the airbag inflator, and the sleeve defines at least one gas exhaust outlet.

An airbag inflator assembly according to the present invention including the inflator attachment and airbag inflator is also provided. The inflator assembly has at least one stop on one of the airbag inflator and inflator attachment that provides a butting engagement with the other of the airbag inflator and the inflator attachment. The inflator assembly also has a snap projection on one of the airbag inflator and the inflator attachment in snap engagement with a snap receptor on the other of the airbag inflator and the inflator attachment. The butting engagement and snap engagement, in combination, retain the airbag inflator within the sleeve of the inflator attachment. During assembly, the airbag inflator is simply inserted into the sleeve of the inflator attachment and retained therein by the butting engagement and snap engagement. The whole inflator assembly is then ready to be mounted in an airbag inflator and secured therein with the at least one mount.

According to one aspect of the present invention, the sleeve of the inflator attachment further includes a plurality of inwardly extending protrusions grippingly engaging the sidewall of the airbag inflator to provide a shake and rattle free engagement between the airbag inflator and sleeve. According to another aspect of the present invention, the sleeve defines at least one gas exhaust outlet located adjacent at least one gas exhaust port defined by the sidewall of the airbag inflator.

According to an additional aspect of the present invention, the stop comprises a flange stop at an end of the airbag inflator, extending outwardly from the sidewall and butting against the sleeve. The snap projection comprises a resilient tab extending inwardly from the sleeve and facing away from the flange stop. The snap receptor comprises a gas exhaust port defined by the sidewall of the airbag inflator, the gas exhaust port engaged by the resilient tab.

According to a further aspect of the present invention, the stop comprises an endwall at an end of the sleeve that butts against the airbag inflator. The snap projection comprises a resilient tab extending inwardly from the sleeve and facing the endwall. The snap receptor comprises a gas exhaust port defined by the sidewall of the airbag inflator, the gas exhaust port engaged by the resilient tab.

Another airbag inflator assembly according to the present invention including an airbag inflator and inflator attachment is provided. The inflator attachment includes a sleeve receiving and supporting an elongated sidewall of the airbag inflator. The sleeve has a plurality of inwardly extending protrusions securely and grippingly engaging the sidewall of the airbag inflator to retain the airbag inflator within the sleeve of the inflator attachment. The inflator attachment also includes at least one mount extending from the sleeve for securing the airbag inflator assembly within an airbag module. According to one aspect of the present invention, the sleeve of the inflator attachment has an endwall butting against the airbag inflator.

The present invention, therefore, provides means for mounting an airbag inflator within an airbag module that requires fewer parts, less assembly time, is conducive to automated assembly, and reduces the size of an airbag module.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 2:
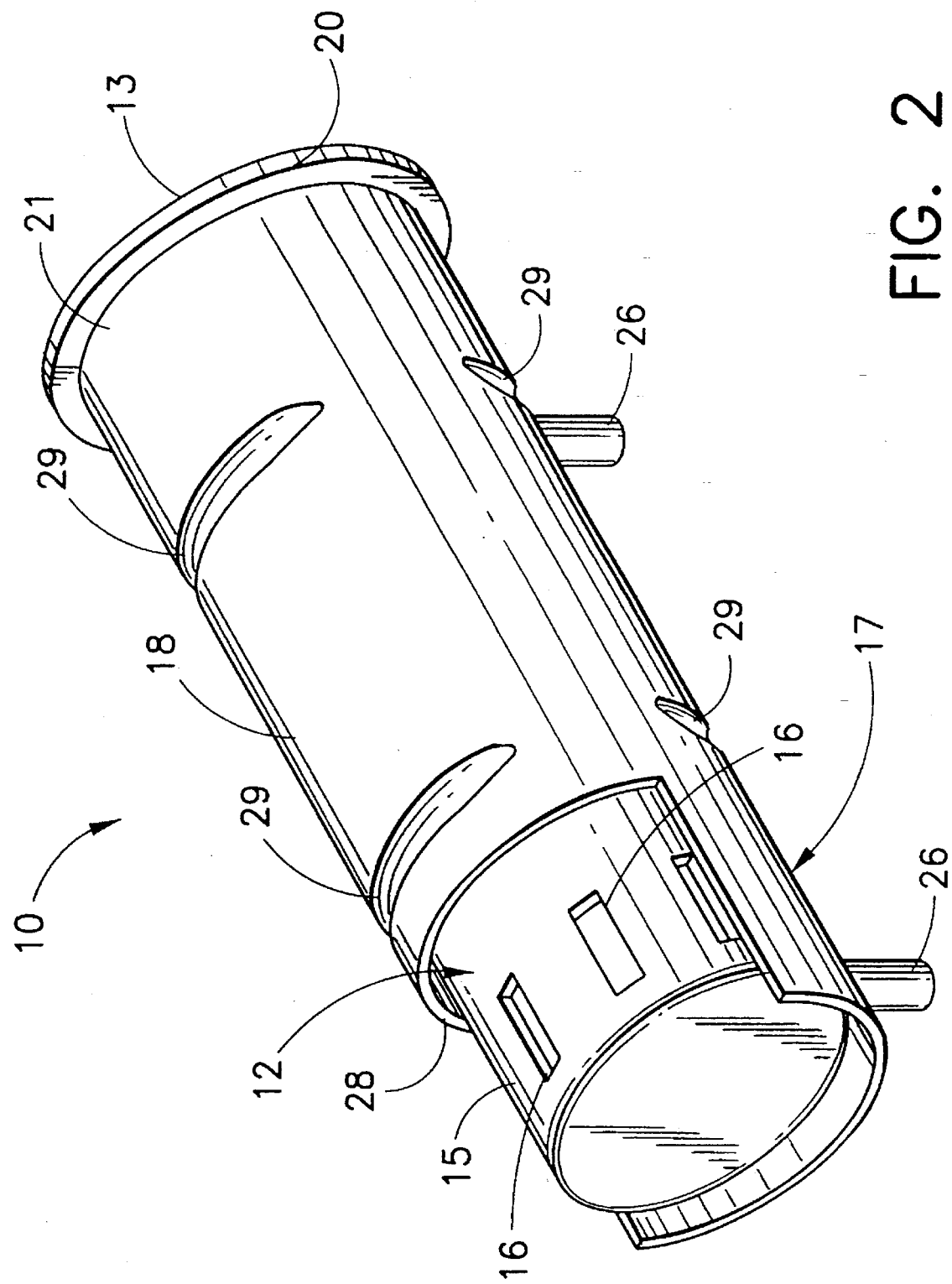
FIG. 2 is a perspective view of an airbag inflator assembly according to the present invention and incorporating the inflator attachment of FIGS. 1.
Figure 3:
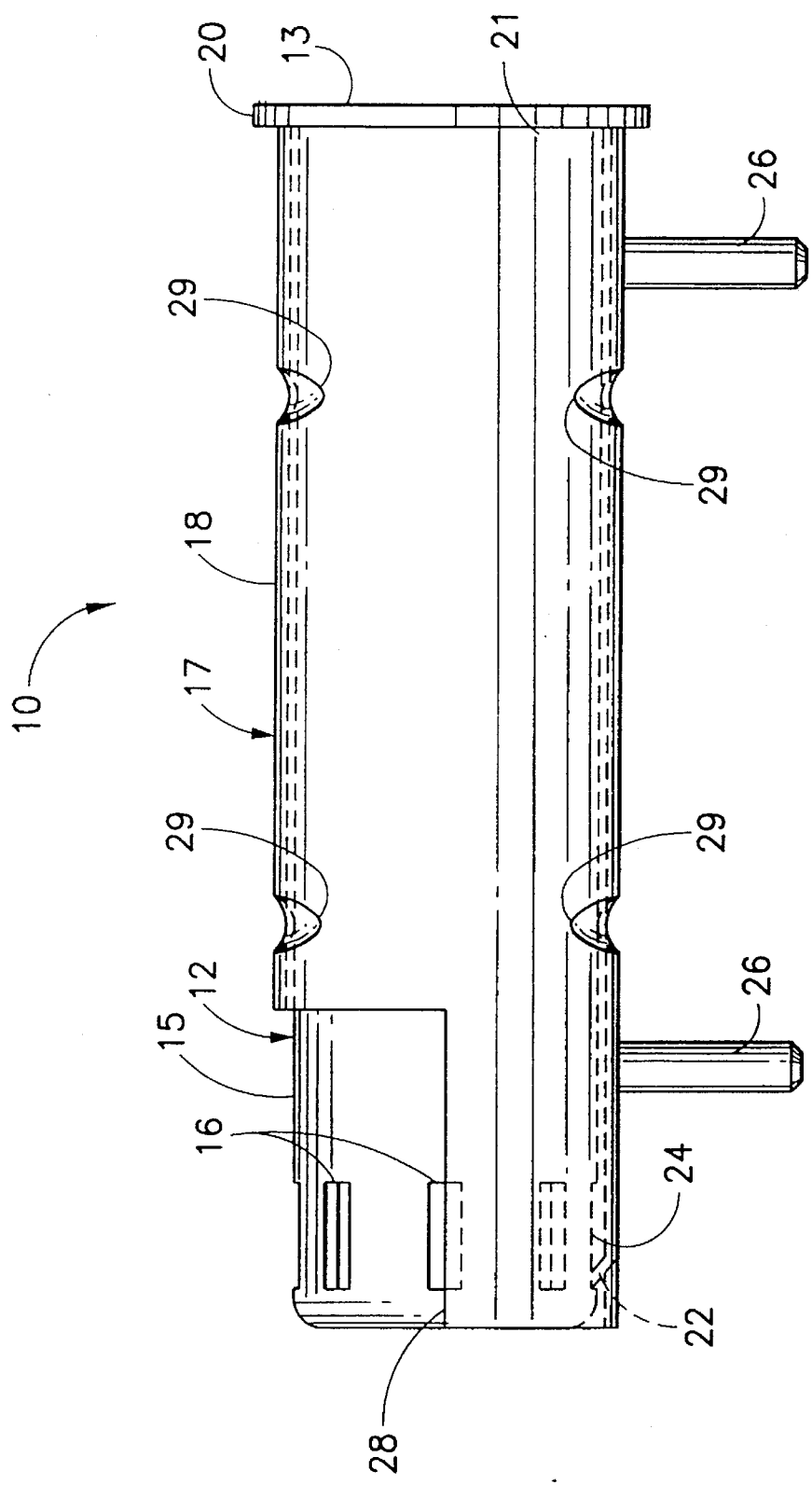
FIG. 3 is a side plan view of the airbag inflator assembly of FIG. 2.

Referring first to FIGS. 2 and 3, the present invention is directed to an airbag inflator assembly generally represented by the reference numeral 10. The inflator assembly 10 is for use in an airbag module and comprises an airbag inflator 12 having an elongated cylindrical sidewall 15 defining a plurality of gas exhaust ports 16, and an inflator attachment 17 including a sleeve 18 that receives and supports the sidewall 15 of the airbag inflator 12. As is known in the art, the airbag inflator contains a gas generant system that, when initiated, delivers inflation gas that exits the airbag inflator 12 through the gas exhaust ports 16 for inflating an airbag cushion of an airbag module. Only the sidewall 15 and gas exhaust ports 16 of the airbag inflator 12 are, however, related to the present invention and described in detail.

Figure 1:
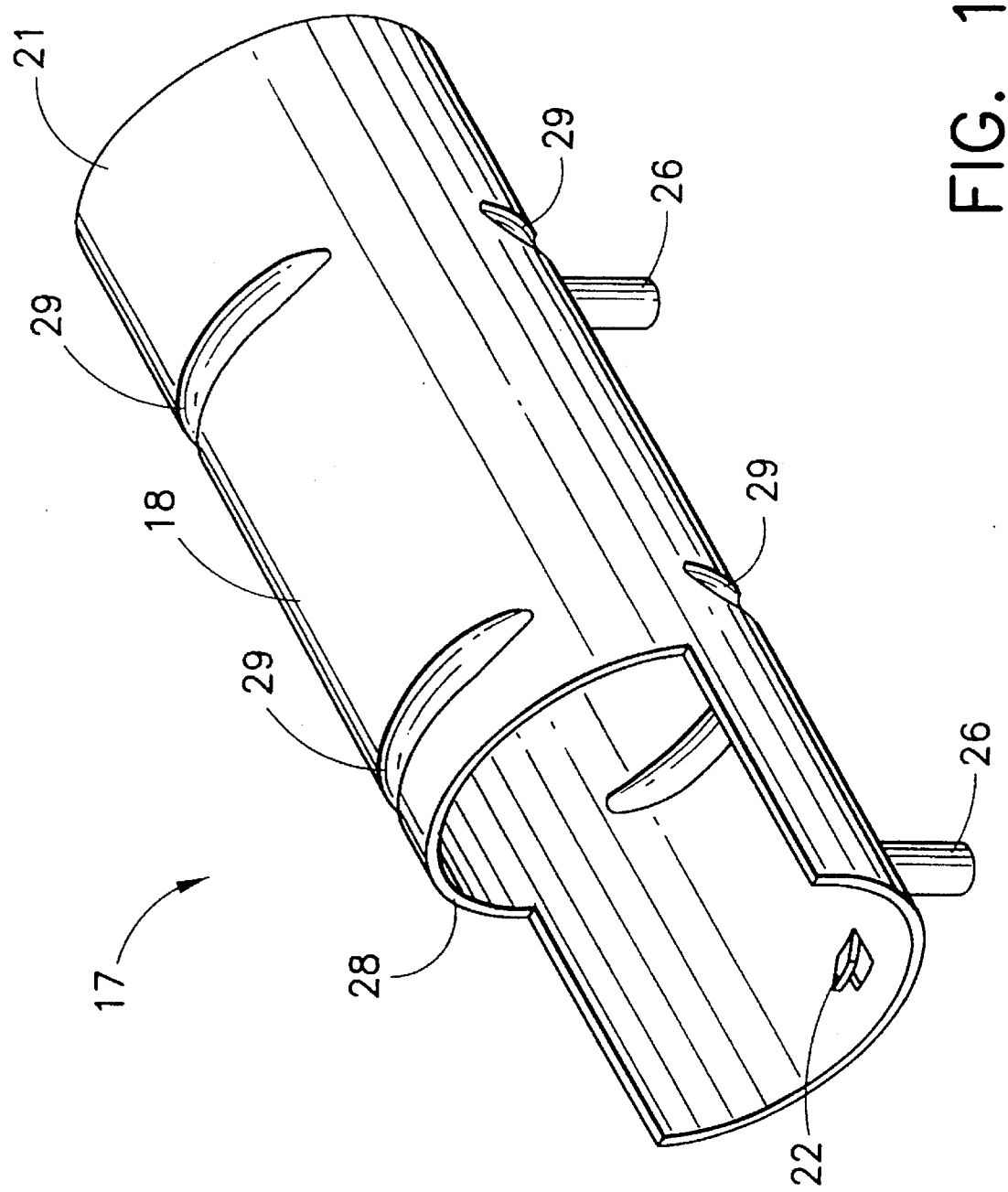
FIG. 1 is a perspective view of an inflator attachment according to the present invention for mounting an airbag inflator within an airbag module.

The airbag inflator 12 has at an end 13 thereof a flange stop 20 that extends radially outwardly from the sidewall 15. When the airbag inflator 12 is received in the sleeve 18, the flange stop 20 provides butting engagement with an end 21 of the sleeve 18. As best shown in FIGS. 1 and 3, the sleeve 18 has an inwardly projecting grip 22 to engage the airbag inflator 12. The grip is in the form of a snap projection provided as a resilient tab 22 that extends inwardly from the sleeve 18 and faces away from the flange stop 20 and sleeve end 21. The resilient tab 22 is snap engaged in one gas exhaust port 24 of the plurality of gas exhaust ports 16 defined by the sidewall 15 of the airbag inflator 12, whereby the gas exhaust port 24 engaged by the tab 22 provides a snap receptor engaged by the snap projection. The butting engagement of the flange stop 20 with the sleeve end 21 and the snap engagement of the tab 22 in the gas exhaust port 24, in combination, retain the airbag inflator 12 within the sleeve 18.

The sleeve 18 includes as a further grip, two spaced-apart pairs of diametrically opposed, inwardly extending protrusions in the form of ribs 29 that grippingly engage the sidewall 15 of the airbag inflator 12. The ribs 29 grip the airbag inflator 12 to provide a shake and rattle free engagement between the airbag inflator 12 and the sleeve 18. The ribs 29 also provide less contact area between the sleeve 18 and the airbag inflator 12 and, therefore, less frictional resistance to sliding, making it easier to insert the airbag inflator 12 into the sleeve 18.

The sleeve 18 substantially surrounds the sidewall 15 of the airbag inflator 12 and also defines at least one gas exhaust outlet 28 positioned adjacent the plurality of gas exhaust ports 16 on the airbag inflator 12. The airbag inflator 12 shown is a hybrid type inflator having the plurality of gas exhaust ports 16 located at one end thereof. The gas exhaust outlet 28 is similarly located at one end of the sleeve 18. The ribs 29 additionally provide spacing from the sidewall 15 to allow inflation gas to exit the gas exhaust ports 16 that are positioned on the lower side of the airbag inflator 12 and covered by the sleeve 18 as shown in the figures.

The sleeve 18 is made from a suitable material such as steel, for example, and the resilient tab 22 is punched in the sleeve 18. As shown, the inflator attachment 17 further includes mounts comprising studs 26 extending outwardly from and transversely to the sleeve 18 for securing the inflator attachment 17 and airbag inflator 12 within an airbag module. The studs 26 are secured to the sleeve by welding or another suitable method.

During assembly, the airbag inflator 12 is simply slid into the sleeve 18 until the sleeve end 21 butts against the flange stop 20 of the airbag inflator 12. The inwardly projecting resilient tab 22 is bendable away from the housing 14 of the airbag inflator 12 to allow passage of the airbag inflator 12, and the tab 22 snap engages the gas exhaust port 24 defined by the sidewall 15 of the airbag inflator 12 so that the airbag inflator 12, once inserted into the sleeve 18, is retained therein. The butting engagement of the flange stop 20 and sleeve end 21 and the snap engagement of the resilient tab 22 and gas exhaust port 24, in combination secure the airbag inflator 12 within the sleeve 18. The airbag inflator 12 and inflator attachment 17 are then ready to be mounted within an airbag module with the studs 26. The sleeve 18 is adapted for use with an existing airbag inflator 12. The present invention, therefore, provides an inflator attachment 17 that easily mounts the airbag inflator 12 within an airbag module.

Figure 4:
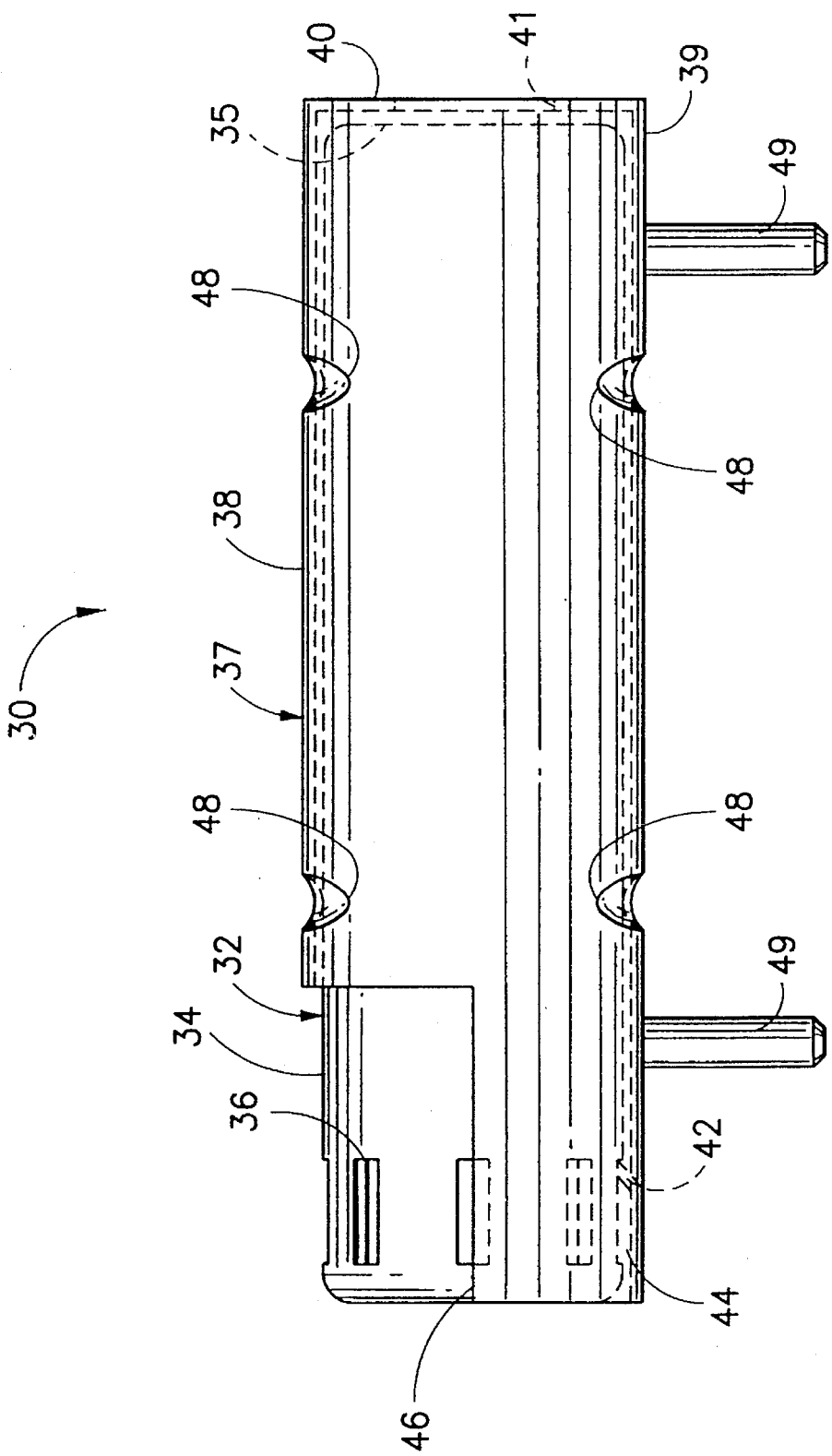
FIG. 4 is a side plan view of another airbag inflator assembly according to the present invention.

Referring to FIG. 4, another airbag inflator assembly 30 according to the present invention is shown. The airbag inflator assembly 30 comprises an airbag inflator 32 having an elongated cylindrical sidewall 34 defining a plurality of gas exhaust ports 36, and an inflator attachment 37 having a tubular sleeve 38 receiving and supporting the sidewall 34 of the airbag inflator 32. The inflator attachment 37 has a stop in the form of an endwall 40 extending across an end 39 of the sleeve 38. The endwall 40, which has an access opening 41 to connect the airbag inflator 32 to a remote collision sensor, butts against an end 35 of the airbag inflator 32 to provide a butting engagement between the sleeve 38 and an end 35 of the airbag inflator 32. The sleeve 38 also has a grip provided as a snap projection in the form of an inwardly extending resilient tab 42 that faces the endwall 40 and is snap engaged in a snap receptor comprising one gas exhaust port 44 of the plurality of gas exhaust ports 36 defined by the sidewall 34 of the airbag inflator 32. The airbag inflator 32, once inserted into the sleeve 38, is retained in the sleeve 38 by the snap engagement between the resilient tab 42 and the gas exhaust port 44 which, in combination with the butting engagement between the endwall 40 and the end 35 of the inflator housing 33, secures the airbag inflator 32 within the sleeve 38.

The sleeve 38 also defines a gas exhaust outlet 46 positioned adjacent the plurality of gas exhaust ports 36 on the airbag inflator 32, and the grip also includes two spaced-apart pairs of diametrically opposed, inwardly extending protrusions in the form of ribs 48 that grippingly engage the sidewall 34 of the airbag inflator 32, similar to sleeve 18 described above. Two studs 49 extending outwardly from and transversely to the sleeve 38 are provided as mounts for securing the inflator attachment 37 and airbag inflator 32 within an airbag module.

Figure 5:
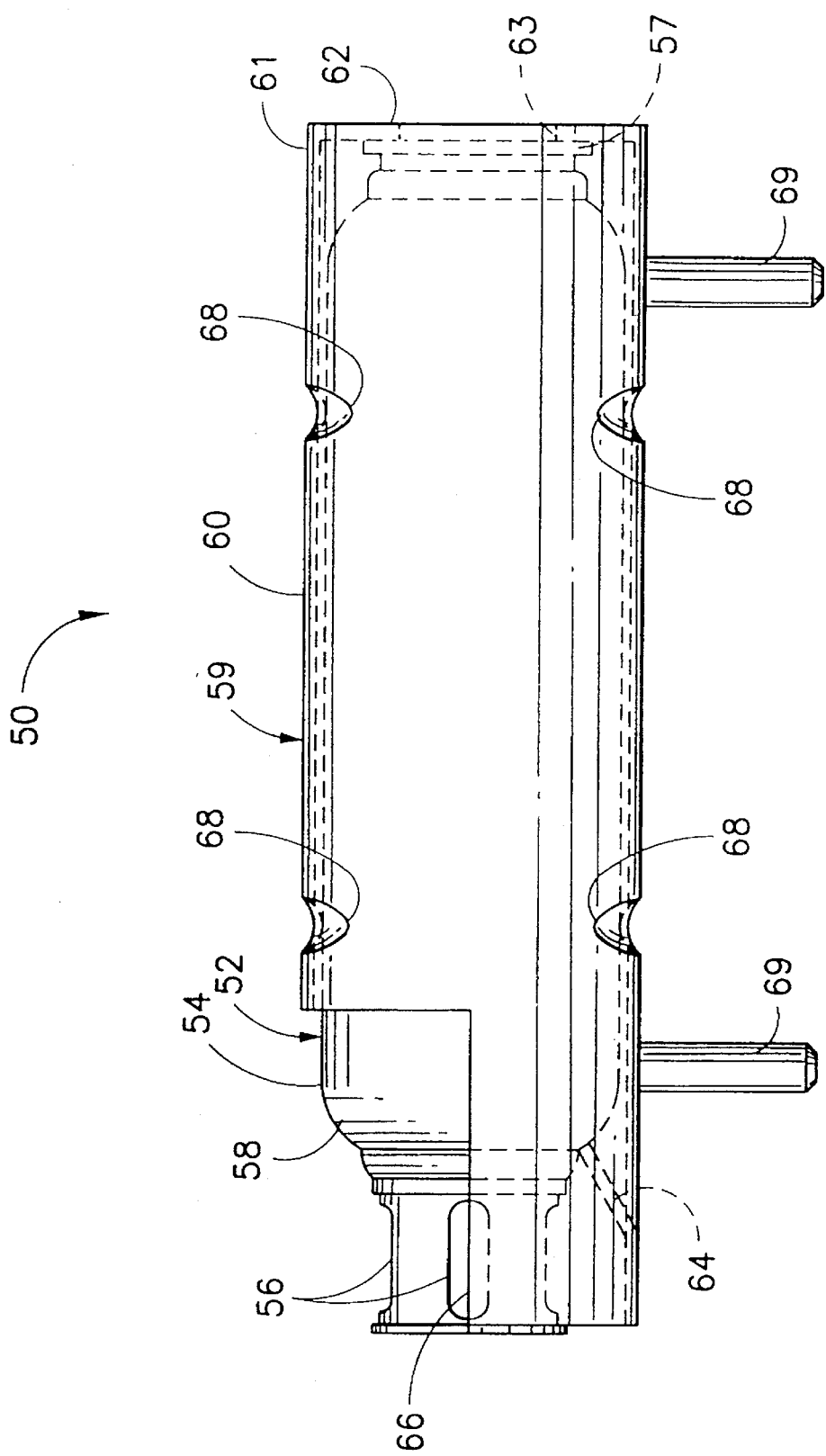
FIG. 5 is a side plan view of an additional airbag inflator assembly according to the present invention.

Referring to FIG. 5, an additional inflator assembly 50 according to the present invention is shown. The inflator assembly 50 comprises an airbag inflator 52 and an inflator attachment 59. The airbag inflator 52 has an elongated generally cylindrical sidewall 54 defining a plurality of gas exhaust ports 56 and a tapered neck 58 between the sidewall 54 and the gas exhaust ports 56. The inflator attachment 59 includes a tubular sleeve 60 receiving and supporting the sidewall 54 of the airbag inflator 52, and a stop in the form of an endwall 62 located at an end 61 of the sleeve 60. The endwall 62, which has an access opening 63 to connect the airbag inflator 52 to a remote collision sensor, butts against and end 57 of the airbag inflator 52 to provide a butting engagement between the sleeve 60 and the airbag inflator 52. The sleeve 60 also has a grip provided as a snap projection in the form of an inwardly extending resilient tab 64 that faces the endwall 62. The tapered neck 58 of the sidewall 54 of the airbag inflator 52 provides a snap receptor, which is snap engaged by the resilient tab 64. The airbag inflator 52, once inserted into the sleeve 60, is retained in the sleeve 6e by a snap engagement between the tab 64 and the tapered neck 58 which, in combination with the butting engagement between the endwall stop 62 and the end 55 of the inflator housing 53, secures the airbag inflator 52 within the sleeve 60.

The sleeve 60 also defines a gas exhaust outlet 66 positioned adjacent the plurality of gas exhaust ports 56 on the airbag inflator 52. The grip of the sleeve 60 additionally includes two spaced-apart pairs of diametrically opposed, inwardly extending protrusions in the form of ribs 68 that grippingly engage the sidewall 54 of the airbag inflator 52. Two mounts comprising studs 69 extend outwardly from and transversely to the sleeve 60 for securing the inflator attachment 59 and airbag inflator 52 within an airbag module.

Figure 6:
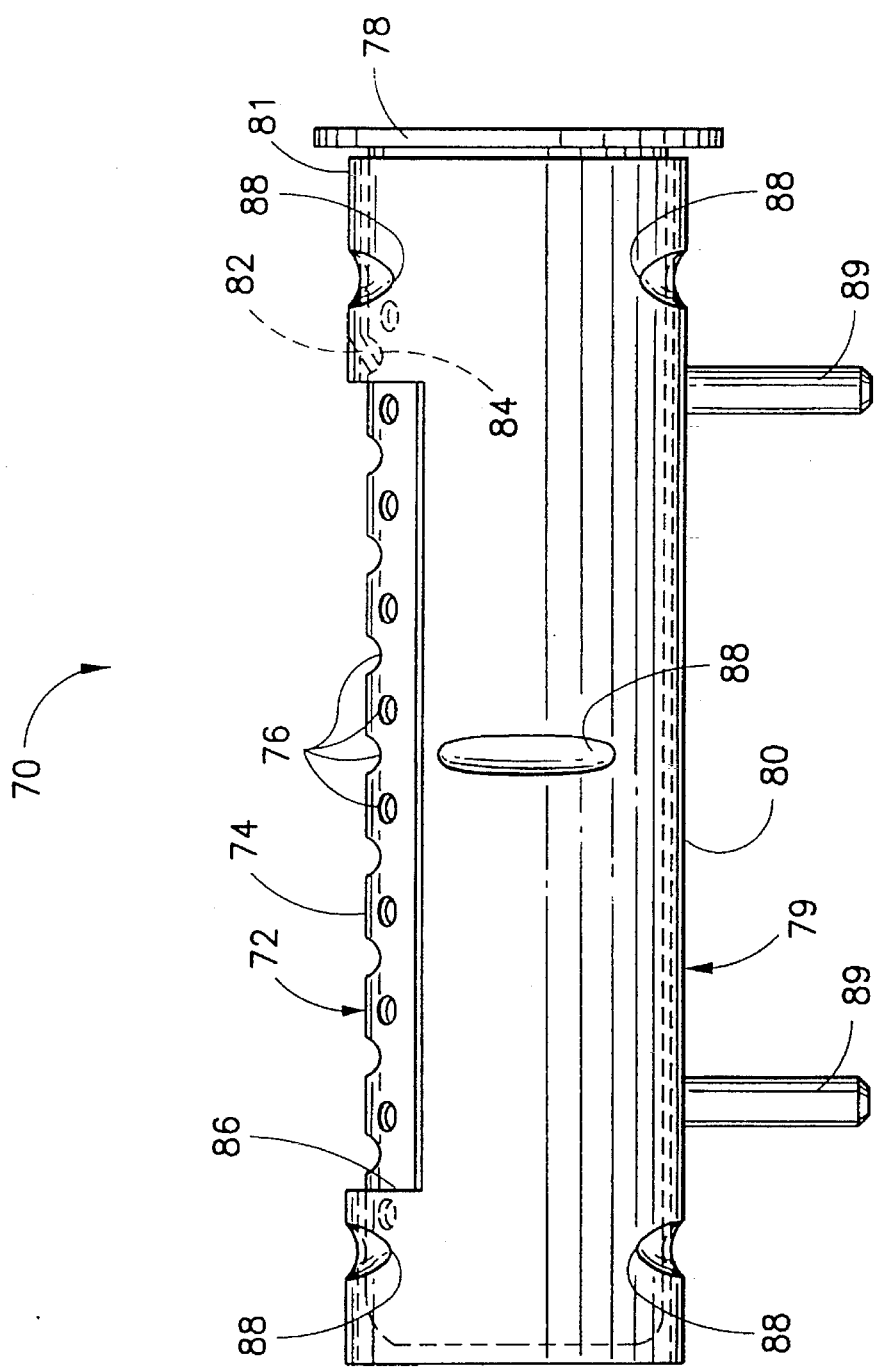
FIG. 6 is a side plan view of a further airbag inflator assembly according to the present invention.

Referring to FIG. 6, a further inflator assembly 70 according to the present invention is shown. The inflator assembly 70 comprises an airbag inflator 72 having an elongated cylindrical sidewall 74 defining a plurality of gas exhaust ports 76, and a flange stop 78 located at an end thereof and extending radially outwardly from the sidewall 74. The airbag inflator 72 is a pyrotechnic type inflator having the plurality of gas exhaust ports 76 distributed substantially along its entire length. An inflator attachment 79 includes a tubular sleeve 80 receiving the sidewall 74 of the airbag inflator 72 with the flange stop 78 of the airbag inflator 72 butting against an end 81 of the sleeve 80 to provide a butting engagement. The sleeve 80 also has a grip provided as a snap projection in the form of an inwardly extending resilient tab 82 that faces away from the flange stop 78 and is snap engaged in snap receptor comprising a gas exhaust port 64 of the plurality of gas exhaust ports 76 defined by the sidewall 74 of the airbag inflator 72. The airbag inflator 72, once inserted into the sleeve 80, is prevented from being pulled out of the sleeve 80 by a snap engagement between the resilient tab 82 and the gas exhaust port 84, which in combination with the butting engagement between the flange stop 78 and the end 81 of the sleeve 80, secures the airbag inflator 72 within the sleeve 80.

The sleeve 80 also defines an elongated gas exhaust outlet 86 extending almost the length of the sleeve 80 and positioned adjacent the plurality of gas exhaust ports 76 defined by the sidewall of the airbag inflator 72. The grip of the sleeve 80 further includes three spaced-apart pairs of diametrically opposed inwardly extending protrusions comprising ribs 88 that grippingly engage the sidewall 74 of the airbag inflator 72. Two mounts comprising studs 69 extend outwardly from and transversely to the sleeve 60, opposite the gas outlet 66, for securing the inflator attachment 79 and inflator 72 within an airbag module.

Figure 7:
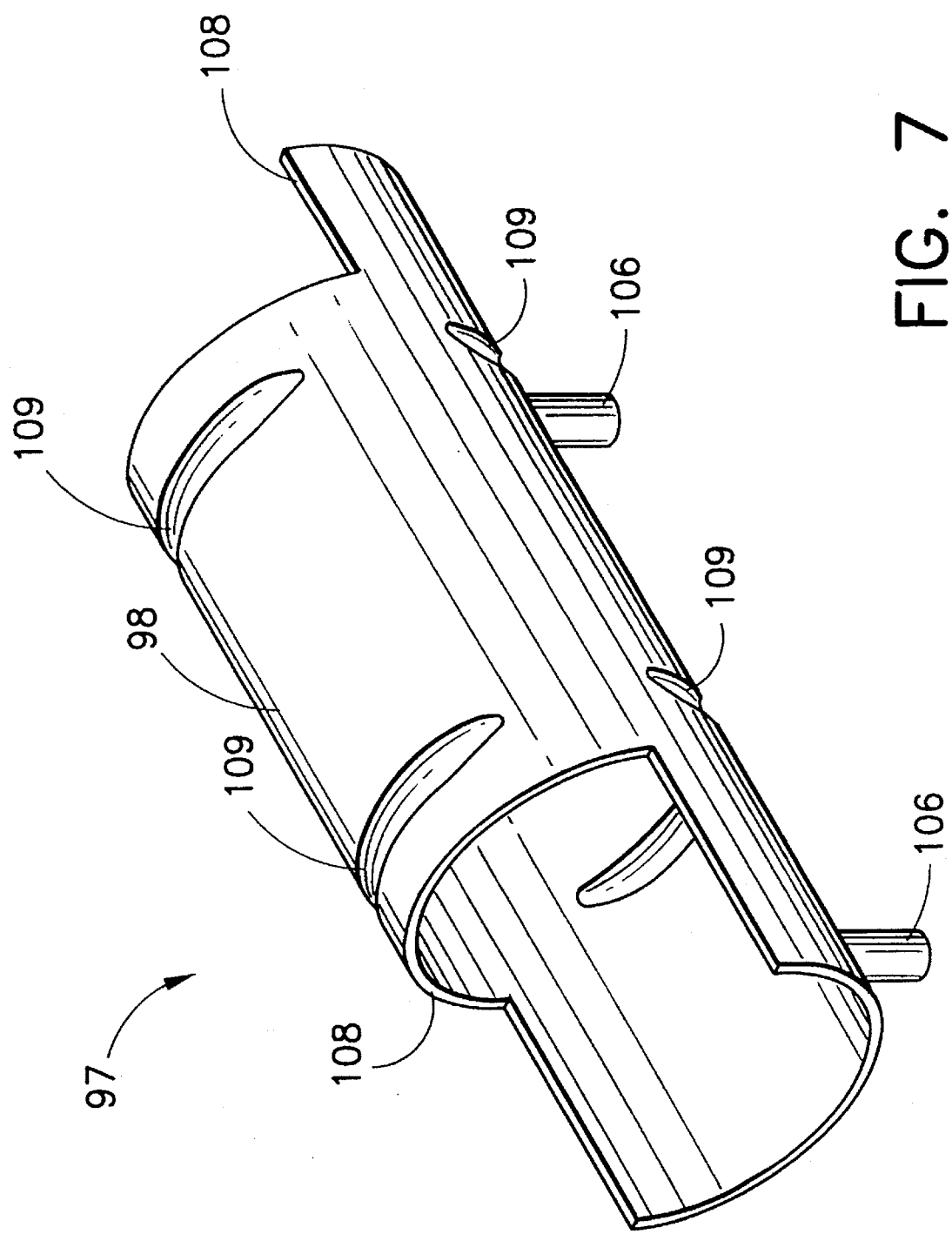
FIG. 7 is a perspective view of another inflator attachment according to the present invention for mounting an airbag inflator within an airbag module.
Figure 8:
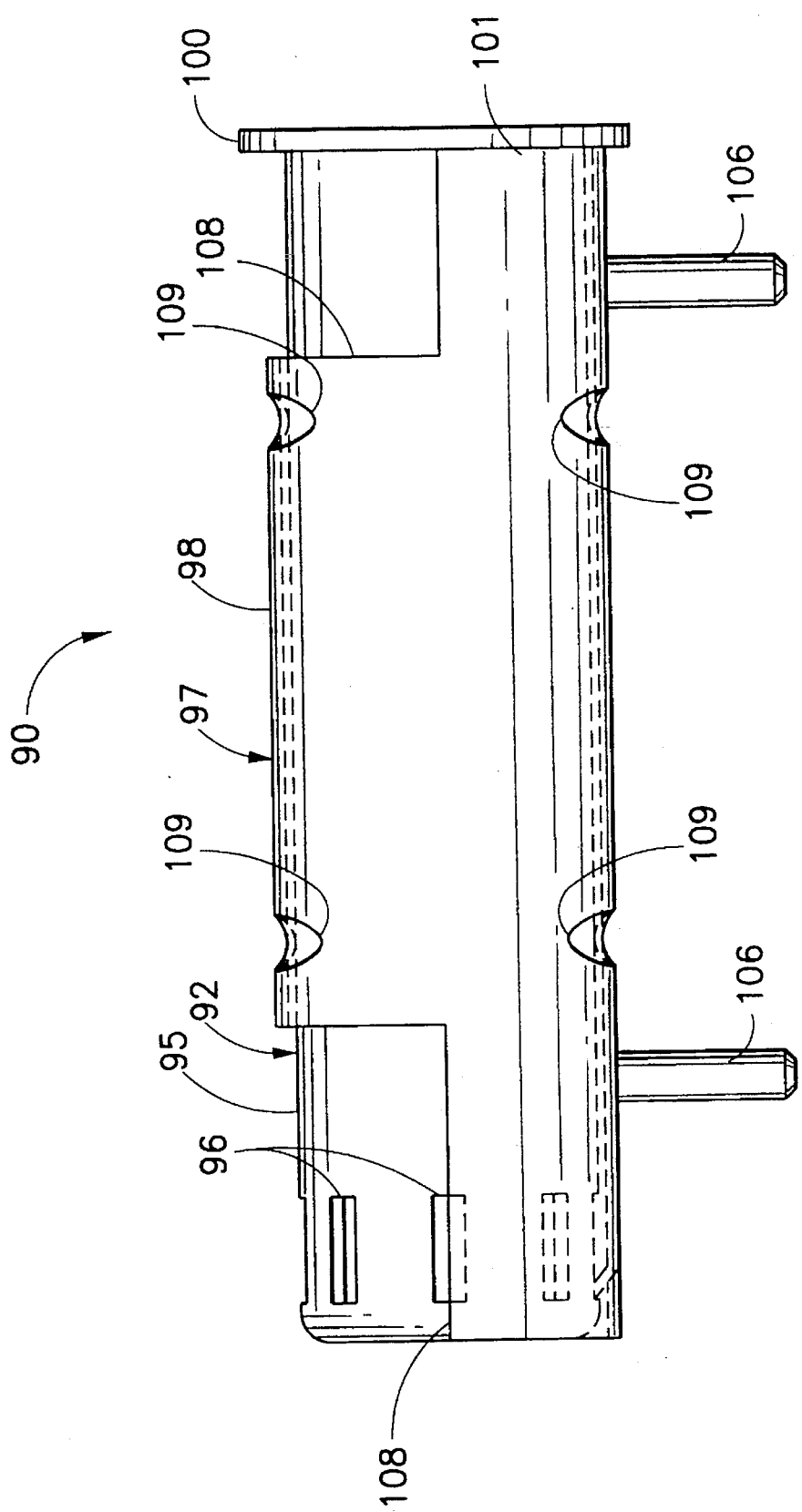
FIG. 8 is a side plan view of an airbag inflator assembly according to the present invention and incorporating the inflator attachment of FIG. 7.

Referring to FIGS. 7 & 6, still another airbag inflator assembly, similar to the airbag inflator assembly 90 of FIGS. 1 through 3, is shown. The inflator assembly 90 comprises an airbag inflator 92 having an elongated cylindrical sidewall 95 defining a plurality of gas exhaust ports 96, and an inflator attachment 97 including a sleeve 98 that receives and supports the sidewall 95 of the airbag inflator 92.

The sleeve 96 includes a grip in the form of two spaced-apart pairs of diametrically opposed, inwardly extending protrusions provided as ribs 109 that grippingly engage the sidewall 95 of the airbag inflator 92 to secure the inflator within the sleeve. The ribs 109 also provide a shake and rattle free engagement between the airbag inflator 92 and the sleeve 98.

The sleeve 96 substantially surrounds the sidewall 95 of the airbag inflator 92 and also defines gas exhaust outlets 108 at both ends of the sleeve. The gas exhaust outlets 108 are positioned so that one of the outlets is located adjacent the plurality of gas exhaust ports 96 on the airbag inflator 92 no matter which side of the sleeve 96 the inflator is inserted into. The ribs 109 additionally provide spacing from the sidewall 95 to allow inflation gas to exit the gas exhaust ports 96 that are positioned on the lower side of the airbag inflator 92 and covered by the sleeve 98 as shown in the figures.

As shown, the inflator attachment 97 further includes mounts comprising studs 106 extending outwardly from and transversely to the sleeve 98 for securing the inflator attachment 97 and airbag inflator 92 within an airbag module. The studs 106 are secured to the sleeve by welding or another suitable method.

During assembly, the airbag inflator 92 is press fit into the sleeve 98 until a sleeve end 101 butts against a flange stop 100 of the airbag inflator 92. It should be noted that there is an extremely tight fit between the two spaced-apart pairs of diametrically opposed, inwardly extending grips in the form of ribs 109 and the sidewall 95 of the airbag inflator 92, and that the sleeve can be provided with a thicker sidewall than the sleeves of FIGS. 1–6 to increase the rigidity of the sleeve. In addition, the two spaced-apart pairs of diametrically opposed, inwardly extending ribs 109 are sized and adapted to more tightly grip the sidewall 95 of the airbag inflator 92 than the inwardly projecting protrusions of the sleeves of FIGS. 1–6. Specifically, the inside diameter of the protrusions of the sleeve of FIGS. 1–6 are about equal to the outside diameter of the sidewall of the airbag inflator, while the inside diameter of the ribs 109 is smaller than the outside diameter of the sidewall 95 of the inflator 92. This permits all of the gripping engagement to be achieved by the ribs 109, rather than by a combination of ribs and snap engagement. The ribs 109 grippingly engage the sidewall 95 of the airbag inflator 92 so that the airbag inflator 92, once inserted into the sleeve 98, is retained therein. The airbag inflator 92 and inflator attachment 97 are then ready to be mounted within an airbag module with the studs 106. The sleeve 98 may also include an endwall similar to the endwall 40 of the sleeve 38 of FIG. 4. The endwall would provide a butting engagement between the sleeve 98 and the airbag inflator 92.

An airbag inflator assembly according to the present invention may also include other changes and modifications without departing from the true spirit and scope of the present invention. For example, the sleeve may include more than one snap projection and the snap projection comprising the resilient tab may alternatively comprise an inwardly extending dimple that is able to slide over the sidewall of the inflator and snap engage a snap receptor of the inflator. The snap receptor may simply comprise an appropriately formed end of the inflator. Also, the sleeve may alternatively include one or more than two mounts, and the mounts may comprise suitable fasteners other than studs such as a flat projecting bracket, for example. Additionally, the sleeve may include more than two or three pairs of inwardly projecting protrusions for gripping the inflator, and the protrusions may comprise dimples, for example, in place of ribs. Many variations are possible without departing from the true spirit and scope of the present invention.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An inflator attachment for mounting an airbag inflator including an elongated sidewall and at least one stop extending transversely outwardly with respect to the sidewall, the inflator attachment comprising:

a sleeve sized and shaped to receive and support the sidewall of the airbag inflator and butt against the stop of the airbag inflator, the sleeve having at least one inwardly projecting grip sized and adapted to allow passage of the sidewall of the airbag inflator into the sleeve and to engage the airbag inflator so that the airbag inflator, once inserted into the sleeve, is retained within the sleeve by the at least one inwardly projecting grip and a butting engagement between the sleeve and the stop of the airbag inflator; and at least one mount extending outwardly from the sleeve for securing the inflator attachment and airbag inflator within an airbag module.

2. The inflator attachment of claim 1 for use with an airbag inflator having a sidewall defining a snap receptor and wherein:

the at least one grip comprises a resilient tab projecting inwardly from the sleeve and bendable away from the airbag inflator to allow passage of the sidewall of the airbag inflator and engageable in the snap receptor of the airbag inflator.

3. The inflator attachment of claim 2 wherein the at least one grip further includes a plurality of spaced-apart protrusions extending inwardly from the sleeve and sized to grippingly engage the sidewall of the airbag inflator.

4. The inflator attachment of claim 1 wherein the at least one grip comprises a plurality of spaced-apart protrusions extending inwardly from the sleeve and sized to grippingly engage the sidewall of the airbag inflator.

5. The inflator attachment of claim 4 wherein the plurality of spaced-apart protrusions comprises at least two spaced-apart pairs of diametrically opposed ribs.

6. The inflator attachment of claim 1 wherein the sleeve substantially surrounds the airbag inflator and defines at least one gas exhaust outlet positioned to expose at least one gas exhaust port defined by the sidewall of the airbag inflator when the airbag retainer is retained within the sleeve.

7. The inflator attachment of claim 1 wherein the mount comprises a stud extending generally transversely to and outwardly from the sleeve.

8. An inflator attachment for mounting an airbag inflator having an elongated sidewall, the inflator attachment comprising:

a sleeve sized and shaped to receive and support the sidewall of the airbag inflator and having an endwall for butting against the airbag inflator when the airbag inflator is received in the sleeve, the sleeve having at least one inwardly projecting grip sized and adapted to allow passage of the sidewall of the airbag inflator into the sleeve and to engage the airbag inflator so that the airbag inflator, once inserted into the sleeve, is retained within the sleeve by the at least one inwardly projecting grip and a butting engagement between the endwall of the sleeve and the airbag inflator; and at least one mount extending outwardly from the sleeve for securing the inflator attachment and inflator within an airbag module.

9. The inflator attachment of claim 8 for use with an airbag inflator having a sidewall defining a snap receptor and wherein:

the at least one grip comprises a resilient tab projecting inwardly from the sleeve and bendable away from the airbag inflator to allow passage of the sidewall of the airbag inflator and engageable in the snap receptor of the airbag inflator.

10. The inflator attachment of claim 9 wherein the at least one grip further includes a plurality of spaced-apart protrusions extending inwardly from the sleeve and sized to grippingly engage the sidewall of the airbag inflator.

11. The inflator attachment of claim 8 wherein the at least one grip comprises a plurality of spaced-apart protrusions extending inwardly from the sleeve and sized to grippingly engage the sidewall of the airbag inflator.

12. The inflator attachment of claim 11 wherein the plurality of spaced-apart protrusions comprises at least two spaced-apart pairs of diametrically opposed ribs.

13. The inflator attachment of claim 8 wherein the sleeve substantially surrounds the airbag inflator and defines at least one gas exhaust outlet positioned to expose at least one gas exhaust port defined by the sidewall of the airbag inflator when the airbag retainer is retained within the sleeve.

14. The inflator attachment of claim 8 wherein the mount comprises a stud extending generally transversely to and outwardly from the sleeve.

15. An airbag inflator assembly for use in an airbag module, the airbag inflator assembly comprising:

an airbag inflator having an elongated sidewall;

an inflator attachment having a sleeve receiving and supporting the elongated sidewall of the airbag inflator;

at least one stop on one of the airbag inflator and inflator attachment providing butting engagement with the other of the airbag inflator and the inflator attachment;

at least one snap projection on one of the airbag inflator and the inflator attachment in snap engagement with at least one snap receptor on the other of the airbag inflator and the inflator attachment, wherein the butting engagement and snap engagement retain the airbag inflator in the sleeve; and at least one mount extending from the sleeve of the inflator attachment for securing the inflator attachment and the airbag inflator within an airbag module.

16. The airbag inflator assembly of claim 15 wherein the snap receptor is formed by the airbag inflator and the snap projection is located on the inflator attachment.

17. The airbag inflator assembly of claim 16 wherein the snap projection comprises a resilient tab extending inwardly from the sleeve of the inflator attachment and the snap receptor comprises a gas exhaust port defined by the sidewall of the airbag inflator and receiving the resilient tab.

18. The airbag inflator assembly of claim 17 wherein the snap projection comprises a resilient tab extending inwardly from the sleeve of the inflator attachment and the snap receptor comprises a tapered neck defined by the sidewall of the airbag inflator and engaged by the resilient tab.

19. The airbag inflator assembly of claim 15 wherein the stop is located on the airbag inflator.

20. The airbag inflator assembly of claim 19 wherein the stop comprises a flange stop located at an end of the airbag inflator, extending outwardly from the sidewall and butting against the sleeve.

21. The airbag inflator assembly of claim 15 wherein the stop is located on the sleeve.

22. The airbag inflator assembly of claim 21 wherein the stop comprises an endwall located at an end of the sleeve of the inflator attachment and butting against the airbag inflator.

23. The airbag inflator assembly of claim 15 wherein the inflator attachment further includes a plurality of spaced-apart protrusions extending inwardly from the sleeve and grippingly engaging the sidewall of the airbag inflator.

24. The airbag inflator assembly of claim 23 wherein the plurality of spaced-apart protrusions comprises at least two spaced-apart pairs of diametrically opposed ribs protruding inwardly from the sleeve and grippingly engaging the sidewall of the airbag inflator.

25. The airbag inflator assembly of claim 15 wherein the sleeve of the inflator attachment substantially surrounds the sidewall of the airbag inflator and defines at least one gas exhaust outlet exposing at least one gas exhaust port defined by the sidewall of the airbag inflator.

26. The airbag inflator assembly of claim 15 wherein the mount comprises a stud extending generally transversely to and outwardly from the sleeve.

27. The airbag inflator assembly of claim 15 wherein the stop comprises a flange stop located at an end of the airbag inflator, extending outwardly from the sidewall and butting against the sleeve, the snap projection comprises a resilient tab extending inwardly from the sleeve and facing away from the flange stop, the snap receptor comprises a gas exhaust port defined by the sidewall of the airbag inflator, the gas exhaust port engaged by the resilient tab.

28. The airbag inflator assembly of claim 15 wherein the stop comprises an endwall located at an end of the sleeve and butting against the airbag inflator, the snap projection comprises a resilient tab extending inwardly from the sleeve and facing the endwall, the snap receptor comprises a gas exhaust port defined by the sidewall of the airbag inflator, the gas exhaust port engaged by the resilient tab.

29. An airbag inflator assembly for use in an airbag module, the airbag inflator assembly comprising:

an airbag inflator having an elongated sidewall;

an inflator attachment having a sleeve receiving and supporting the elongated sidewall of the airbag inflator;

a plurality of spaced-apart protrusions extending inwardly from the sleeve and grippingly engaging the sidewall of the airbag inflator, retaining the airbag inflator in the sleeve; and at least one mount extending from the sleeve of the inflator attachment for securing the inflator attachment and the airbag inflator within an airbag module.

30. The airbag inflator assembly of claim 29 wherein the plurality of spaced-apart protrusions comprises at least two spaced-apart pairs of diametrically opposed ribs.

31. The airbag inflator assembly of claim 29 wherein the sleeve substantially surrounds the airbag inflator and defines at least one gas exhaust outlet exposing at least one gas exhaust port defined by the sidewall of the airbag inflator.

32. The airbag inflator assembly of claim 29 wherein the mount comprises a stud extending generally transversely to and outwardly from the sleeve.

33. The airbag inflator assembly of claim 29 wherein the sleeve of the inflator attachment has an endwall butting against the airbag inflator.

* * * * *

UNITED STATES PATENT AND TRADEMARK OFFICE
CERTIFICATE OF CORRECTION

PATENT NO. : 5,611,563
DATED : March 18, 1997
INVENTOR(S) : Olson et al.

It is certified that error appears in the above-indentified patent and that said Letters Patent is hereby corrected as shown below:

Col. 4, Ln. 11,   "inflator" should read -- inflator 12 -- .
Col. 6, Ln. 48,   "60" should read -- 80 -- .
Col. 6, Ln. 49,   "66" should read -- 86 -- .
Col. 6, Ln. 51,   "6" should read -- 8 -- .
Col. 6, Ln. 59,   "96" should read -- 98 -- .
Col. 6, Ln. 66,   "96" should read -- 98 -- .

Signed and Sealed this

Eleventh Day of November, 1997

Attest:

BRUCE LEHMAN

Attesting Officer

Commissioner of Patents and Trademarks